(12) United States Patent
Mulligan et al.

(10) Patent No.: US 8,825,430 B2
(45) Date of Patent: Sep. 2, 2014

(54) DIFFERENTIAL PRESSURE SYSTEMS AND METHODS FOR MEASURING HYDRAULIC PARAMETERS ACROSS SURFACE WATER-AQUIFER INTERFACES

(76) Inventors: Ann E. Mulligan, East Falmouth, MA (US); Alan T. Gardner, E. Falmouth, MA (US); Terence Hammar, East Falmouth, MA (US); Charles Harvey, Concord, MA (US); Harold F. Hemond, Lexington, MA (US)

( * ) Notice: Subject to any disclaimer, the term of this patent is extended or adjusted under 35 U.S.C. 154(b) by 745 days.

(21) Appl. No.: 12/611,454

(22) Filed: Nov. 3, 2009

(65) Prior Publication Data
US 2010/0198547 A1   Aug. 5, 2010

Related U.S. Application Data

(60) Provisional application No. 61/193,171, filed on Nov. 3, 2008.

(51) Int. Cl.
| | |
|---|---|
| *G01F 1/12* | (2006.01) |
| *E21B 41/00* | (2006.01) |
| *E21B 33/035* | (2006.01) |
| *E21B 47/06* | (2012.01) |
| *G01V 9/02* | (2006.01) |

(52) U.S. Cl.
CPC ......... *E21B 41/0007* (2013.01); *E21B 33/0355* (2013.01); *E21B 47/06* (2013.01); *G01V 9/02* (2013.01)
USPC ....................................................... 702/100

(58) Field of Classification Search
CPC . E21B 41/0007; E21B 33/0355; E21B 47/06; G01V 9/02
USPC ........................................ 702/100; 73/170.32
See application file for complete search history.

(56) References Cited

U.S. PATENT DOCUMENTS

| | | | |
|---|---|---|---|
| 5,497,663 | A | 3/1996 | Reay et al. |
| 5,804,715 | A * | 9/1998 | Bennett ..................... 73/170.32 |
| 6,874,371 | B1 | 4/2005 | Smith et al. |
| 6,993,437 | B1 | 1/2006 | Chadwick et al. |
| 2008/0196509 | A1 | 8/2008 | Charette |

OTHER PUBLICATIONS

Kelly et al., "Measuring the Hydraulic Conductivity of Shallow Submerged Sediments," Ground Water, 41(4):431-439 (2003).
International Search Report and Written Opinion for International Application No. PCT/US2009/063123 mailed Mar. 28, 2011.

* cited by examiner

*Primary Examiner* — Tung S Lau
*Assistant Examiner* — Xiuquin Sun
(74) *Attorney, Agent, or Firm* — Ropes & Gray LLP

(57) ABSTRACT

The systems and methods described herein related to measuring hydraulic parameters across a surface water-aquifer interface. In particular, the systems include a pressure differential sensor within a watertight housing. The pressure differential sensor has two inlets, one of which is connected to a piezometer located in an aquifer, and the other of which is connected to a surface water body. A solenoid valve allows the systems to switch between a first, measurement configuration and a second, calibration configuration. A pump and a conductivity-temperature sensor enable a third and fourth configuration for measuring the electrical conductivity and temperature of surface water and groundwater. The collected data is then locally stored or transmitted wirelessly. The low-power components and calibration capabilities of the systems allow for long-term deployment, on the order of six months or more.

27 Claims, 10 Drawing Sheets

DIFFERENTIAL PRESSURE SYSTEMS AND METHODS FOR MEASURING HYDRAULIC PARAMETERS ACROSS SURFACE WATER-AQUIFER INTERFACES

CROSS-REFERENCE TO RELATED APPLICATIONS

This application claims the benefit of U.S. Provisional Patent Application No. 61/193,171, entitled "Differential low cost durable pressure sensor system for measuring hydraulic parameters across the sediment-water interface of the coastal oceans and inland saltwater lakes" filed on Nov. 3, 2008, the entire disclosure of which is hereby incorporated by reference as if set forth herein in its entirety.

FIELD OF THE INVENTION

This invention relates generally to systems and methods for measuring hydraulic parameters. More specifically, this invention relates to systems and methods for measuring hydraulic parameters such as pressure differentials or fluid flow rate across surface water-groundwater interfaces.

BACKGROUND

Groundwater-surface water interactions can create microhabitats that affect biological productivity in streams, wetland-stream systems, lakes, and the coastal ocean. Groundwater discharge to surface water can also be a significant source of solute mass that affects chemical mass budgets and local ecology. Unfortunately, it is typically quite difficult to characterize water flux across the sediment-aquifer boundary because of spatial heterogeneity and temporal variability. Temporal variability in groundwater-surface water flux can be quite substantial, occurring over time scales of hours, days, weeks, seasons, and years.

Generally, there are three approaches to quantifying flow between aquifers and surface water bodies: (1) direct measurement; (2) hydrogeologic modeling; and (3) indirect measurement. Direct measurement techniques include both manual and automated seep meters. Manual meters are very labor intensive but they sample the flow directly through observing volume changes in an attached pre-filled bag. Because of low seepage rates and high labor requirements, sampling with manual seepage meters generally occurs over a few days with each sample representing an integrated flow over several hours. Therefore, manual seep meters cannot resolve either very short or long term temporal seepage patterns. Furthermore, factors associated with seep meter design (e.g., head loss through the collection chamber) and the external environment (e.g., waves and currents) can affect results and lead to large uncertainties. Automated seep meters may overcome many of the problems associated with manual meters, are less labor-intensive, and allow for better temporal resolution of seepage. However, they tend to be expensive, have high power requirements, and are subject to biofouling and therefore need frequent maintenance while deployed. Consequently, they too are not suited for measuring long-term seepage patterns.

Hydrogeologic modeling of groundwater-surface water interactions can take several different forms depending on the available data and scale of interest: Darcy's law, water budgets, hydrograph separation, and numerical modeling have all been used to calculate water fluxes. Darcy's law calculations can be used locally to determine the flux between two locations or can be used more regionally to determine large-scale flow through a system. Similarly, water budgets and hydrograph separation techniques lead to flow estimates over larger scales. Regional estimates of flow do not provide details within small spatial scales, such as within the hyporheic zone or shallow tidally-induced flow, where many important biogeochemical processes occur. Numerical models can be used for both large and small scale studies and can accommodate temporal variability. While such models offer a wider ability to characterize surface water—groundwater interactions, they can only be as good as the data used to build them and they require significant field data. Hence, numerical modeling, while potentially powerful, can be limited by data needs.

Indirect flux estimation techniques measure independent variables from which flux is calculated and typically include some type of natural tracer. The mass balance tracer methods result in spatially integrated flux estimates and therefore do not provide spatial variability information. In addition, spatial and temporal variability in groundwater tracer concentrations can lead to significant uncertainties in the resulting flux estimates. Inverse modeling using one or more tracers can provide point estimates that can be difficult to use for large-scale flow estimation when spatial heterogeneity is high. Furthermore, there is uncertainty in the modeling because many hydrogeologic parameters, such as permeability, dispersivity, porosity, and anisotropy, are all unknown yet must be included in the model. Accordingly, there is a need for improved systems and methods for measuring and quantifying flow between aquifer and surface water bodies.

SUMMARY

The systems and methods described herein related to measuring hydraulic parameters across a surface water-aquifer interface. In particular, the systems include a pressure differential sensor disposed within a watertight housing. The pressure differential sensor has two inlets, one of which is connected to a piezometer located in an aquifer, and the other of which is connected to a surface water body. A solenoid valve allows the systems to switch between a first, measurement configuration and a second, calibration configuration. A pump and a conductivity-temperature sensor enable a third and fourth configuration for measuring the electrical conductivity and temperature of surface water and groundwater. The collected data is then locally stored or transmitted wirelessly. Among other things, the low-power components and calibration capabilities of the systems allow for long-term deployment, on the order of six months or more.

Water and solute mass flux across the groundwater—surface water interface can play a significant role in biogeochemical processes and is an important component of the hydrologic cycle. This flux can be difficult to quantify because of significant spatial and temporal variability in fluid flow and solute concentrations. The sensor may be particularly useful for characterizing spatial trends in groundwater—surface water interactions in locations that are difficult to access either because of remoteness or because of obstacles. In some embodiments, sensors that can continuously operate in harsh environmental conditions, such as winter conditions, without needing maintenance, may be useful.

The sensor may also be useful for characterizing temporal or long-term trends in groundwater—surface water interactions. In particular, sensors that can continuously and automatically measure groundwater—surface water interactions over a multitude of time scales ranging from several months to several seasons may be useful. Such long-term measurements are valuable because of large observed imbalances between fluid flows between aquifers and surface water bodies, which cannot be explained by short-term fluid flux measurements. For example, in winter, because of changes in water table elevation, the interface between fresh water and salt water may shift landward resulting in a large fluid flux into aquifers. In contrast, during summer, the interface shifts away from land, which may result in a large fluid flux out of aquifers. Short term measurements may be unable to quantify this seasonal imbalance. Accordingly, the systems and methods described here may be particularly useful for characterizing water flux between an aquifer and a surface water body over time periods of several months or seasons. An in-situ sensor is described here that automatically measures and records the differential pressure between two locations and the electrical conductivity and temperature of both water bodies over long time scales ranging from several months to several seasons.

In one embodiment, the sensor records differential pressure between a surface water body and shallow groundwater. In some embodiments, the pressure difference between any two points within the shallow subsurface may be recorded by the sensor. The sensor is low-cost and designed to operate for long time periods without manual intervention. In some embodiments, the sensor is designed to continuously operate in harsh environmental conditions, such as winter conditions, without needing maintenance.

Actual deployment time may depend on several variables, including user-specified sampling frequency. The sensor may be deployed for at least 6 months with an approximately 15-minute sampling interval for differential pressure and an approximately 3-hour sampling interval for temperature and electrical conductivity (EC). The latter two parameters can be used in variable-density settings, such as the coastal ocean or inland saltwater lakes, to calculate forced gravitational convection. In some embodiments, temperature and EC could be used as tracers to calculate hydraulic parameters within the sediment. The collected data may be used with Darcy's law to estimate water flux between the two measurement points. In some embodiments the sensor is anchored to the sediment floor and away from surface hazards such as boats and winter ice.

Although the application described herein is for vertical flow across the sediment-water boundary, the differential pressure sensor may also be used to measure the differential pressure between any two saturated locations; useful for determining horizontal or vertical flow and/or monitoring gradients within shallow groundwater systems such as wetlands, seepage faces, or hyporheic zones, for example.

Further, the DP sensor may also be deployed in a constant-density environment with electrical conductivity and temperature used as multiple tracers.

According to one aspect of the invention, a submersible system for measuring hydraulic parameters across an interface between a surface water body and an aquifer is provided. The submersible system may include a piezometer, a surface fluid port, a watertight housing, a differential pressure sensor disposed within the housing, and a valve disposed within the housing. The piezometer may be disposed in the aquifer for collecting groundwater. The surface fluid port may be disposed in the surface water body and exposed to the surface water. The differential pressure sensor may have at least two inlets, and may be used for collecting data representative of differential pressure between the groundwater collected by the piezometer and the surface water at the surface fluid port. The valve may be connected to the piezometer, the surface fluid port, and the differential pressure sensor for controlling flow of the groundwater and/or the surface water to the differential pressure sensor. In a first configuration, the valve may be configured to connect one inlet of the differential pressure sensor to the piezometer and another inlet of the pressure sensor to the surface fluid port. In a second configuration, the valve may be configured to connect at least two inlets of the differential pressure sensor to the piezometer.

In some embodiments, the system may include processing circuitry. The processing circuitry may be configured to automatically operate the valve to switch between different configurations. In certain embodiments, the system may include a pump and a fluid sensor. The pump may be configured to circulate the groundwater and/or the surface water from the piezometer and/or the surface fluid port. The fluid sensor may be configured to measure electrical conductivity and/or temperature of the groundwater and/or the surface water. In a third configuration, the pump may be configured to circulate the surface water through the fluid sensor. In a fourth configuration, the pump may be configured to circulate the groundwater through the fluid sensor. In the third and/or the fourth configuration, the pump may be configured to flush the system to remove air bubbles. In one embodiment, the system may include processing circuitry configured to automatically operate the valve and/or the pump to switch between different configurations.

In certain embodiments, the system may include a communications link for transmitting collected data. The communications link may transmit the collected data in substantially real time. In some embodiments, the communications link may include a fiber optic link and/or a wireless link. In certain embodiments, the system may include a memory device for storing the collected data. The memory device may include a Compact Flash memory card.

In some embodiments, the processing circuitry may be configured to automatically operate the valve according to a pre-programmed schedule. Optionally, the submersible system may be configured to collect data at intervals of about fifteen minutes for six contiguous months or more. In certain embodiments, the submersible system may include a battery pack for supplying power.

According to another aspect of the invention, a method for measuring hydraulic parameters across an interface between a surface water body and an aquifer is described. The method includes providing a submersible system having a piezometer, a surface fluid port, a watertight housing, a differential pressure sensor disposed within the housing, a valve disposed within the housing, and processing circuitry for controlling the valve. The piezometer may be disposed in the aquifer for collecting groundwater. The surface fluid port may be disposed in the surface water body and exposed to the surface water. The differential pressure sensor may have at least two inlets. The valve may be connected to the piezometer, the surface fluid port, and the differential pressure sensor, for controlling flow of the groundwater and/or the surface water to the differential pressure sensor. The method may include collecting data with the differential pressure sensor representative of differential pressure between the groundwater collected by the piezometer and the surface water at the surface fluid port in a first configuration where the valve is configured to connect one inlet of the differential pressure sensor to the piezometer and another inlet to the surface fluid port. The method may include collecting calibration data with the differential pressure sensor in a second configuration where the valve is configured to connect at least two inlets of the differential pressure sensor to the piezometer. The method may include automatically switching from one configuration to a different configuration with the processing circuitry.

In some embodiments, the submersible system includes a fluid sensor and a pump configured to circulate the groundwater and/or the surface water from the piezometer and/or the surface fluid port. The method may further include collecting data representative of the electrical conductivity and/or temperature of the surface water with the fluid sensor in a third configuration where the pump is configured to circulate the surface water through the fluid sensor. The method may also include collecting data representative of the electrical conductivity and/or temperature of the groundwater with the fluid sensor in a third configuration where the pump is configured to circulate the groundwater through the fluid sensor. The method may also include flushing the system with the pump to remove air bubbles.

In some embodiments, the submersible system may include a communications link, and the method may include transmitting the collected data. Optionally, the method may include transmitting the collected data in substantially real time. In certain embodiments, the communications link may include a fiber optic link and/or a wireless link. In some embodiments, the submersible system may include a memory device, and the method may include storing the collected data on the memory device. Optionally, the memory device may include a Compact Flash memory card. In some embodiments, automatically switching may include automatically switching according to a pre-programmed schedule. In certain embodiments, the method may include collecting data with the differential pressure sensor at intervals of about fifteen minutes for at least six contiguous months. In some embodiments, the submersible system may include a battery pack for supplying power.

BRIEF DESCRIPTION OF THE FIGURES

The foregoing and other objects and advantages of the invention will be appreciated more fully from the following further description thereof, with reference to the accompanying drawings wherein.

DETAILED DESCRIPTION

Figure 1:
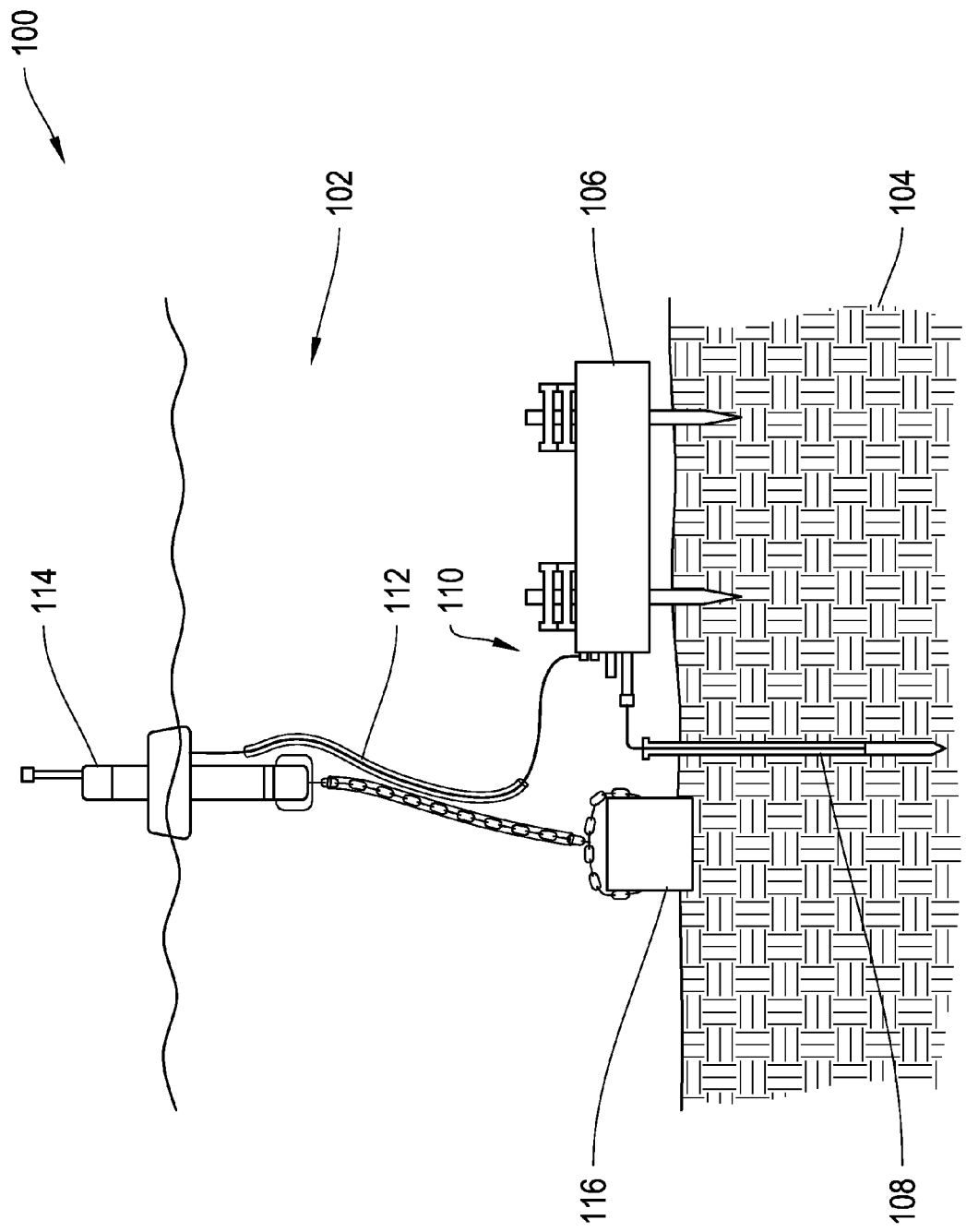
FIG. 1 depicts a system for measuring hydraulic parameters, according to an illustrative embodiment of the invention.

To provide an overall understanding of the invention, certain illustrative embodiments will now be described, including systems and methods for measuring hydraulic parameters across surface water-aquifer interfaces. However, it will be understood by one of ordinary skill in the art that the systems and methods described herein may be adapted and modified for other suitable applications, such as measuring fluid parameters across interfaces with other types of fluids, and that such other additions and modifications will not depart from the scope thereof.

The systems and methods described herein related to measuring hydraulic parameters such as fluid flux, solute flux, and/or differential pressure across a surface water-aquifer interface. In particular, the systems include a pressure differential sensor within a watertight housing. The pressure differential sensor has two inlets, one of which is connected to a piezometer located in an aquifer, and the other of which is connected to a surface water body. A solenoid valve allows the systems to switch between a first, measurement configuration and a second, calibration configuration. A pump and a conductivity-temperature sensor enable a third and fourth configuration for measuring the electrical conductivity and temperature of surface water and groundwater. The collected data is then locally stored or transmitted wirelessly. The low-power components and calibration capabilities of the systems allow for long-term deployment, on the order of six months or more, and in harsh environmental conditions such as severe winter weather and highly saline environments, with low maintenance requirements.

Consider the general form of Darcy's Law, applicable to both constant-density and variable-density flow:

$$q = -\frac{k}{\mu}(\nabla P + \rho g \nabla z) \quad (1)$$

where q=specific discharge vector ($L^3T^{-1}$), k=permeability tensor ($L^2$), $\mu$=viscosity ($ML^{-1}T^{-1}$), P is pressure ($ML^{-1}T^{-2}$), $\rho$=density ($ML^{-3}$), g=gravitational vector ($LT^{-2}$) and z=elevation (L). In the vertical direction, this simplifies to $$q_z = -\frac{k_z}{\mu}\left(\frac{\partial P}{\partial z} + \rho g\right) \quad (2)$$

In some embodiments, the systems and methods described herein measure the independent variables from which flow rates can be calculated. In these embodiments, the system may be deployed on the underwater floor, and may be used to estimate bi-directional fluxes across the sediment-water interface by measuring the pressure gradient between the bottom of the water column and porewater at a depth of 1 m into the sediment. Assuming that vertical flow is uniform over this meter depth of sediment, the vertically integrated flow equation becomes:

$$q_z = -\frac{k_z}{\mu}\left(\frac{P_a - P_c}{h} + \frac{g}{h}\int_h \rho_s dz\right) \quad (3)$$

where $P_a$=fluid pressure at the seafloor, $P_c$=pressure at a collection point in the sediment, h=vertical distance between the seafloor and the collection point, and $\rho_s$=density of porewater in the sediment, which is a function of elevation z.

The first term in parentheses represents the pressure difference between two measurement points while the second term represents the average density of porewater between the two locations. To constrain estimates of the fluid viscosity and the depth-averaged fluid density, the electrical conductivity and temperature of fluid at both measuring points may be measured. The salinity of the surface water and groundwater may be calculated from these data using the Practical Salinity Scale, described in (Perkin and Lewis, 1980), and the density of the water may be calculated using the International Equation of State of Seawater, described in (UNESCO, 1981). Viscosity may be determined using either of the constitutive relationships presented by Langevin et al. (2008). All of these foregoing references are hereby incorporated by reference in their entirety.

Sediment permeability may be determined independently and may be a large source of uncertainty when calculating flux. Methods for determining permeability may include slug tests, pump tests, or calibration with a seep meter. Techniques combining a seep meter, piezometers, and pump test may also be used. In some embodiments, the actual value of permeability is unimportant as long as it stays constant.

In some embodiments, the objective of the differential pressure (DP) instrument is to measure small pressure differences over small (O(~1 m)) spatial scales. In these embodiments, gradient reversals may be expected several times a day in response to diurnal tides. Therefore, accurate DP measurements on the mm $H_2O$ scale may be useful. To that end, desirable characteristics for the sensors include (1) measurement accuracy of differential pressure to within ±0.5 mm water head, over a full scale range of roughly ±200 mm; (2) temperature measurement accuracy of ±1° C.; and (3) electrical conductivity accuracy of ±1 mS/cm. In some embodiments, the following additional specifications may be desirable: user-programmable measurement frequency; on-board power sufficient to support differential pressure measurements every 15 minutes for at least 6 months; data storage capability; sensor compatibility with saline water; and low building, operation, and maintenance costs.

FIG. 1 depicts a system 100 for measuring hydraulic parameters, according to an illustrative embodiment of the invention. A submersible system 106 is disposed near the interface between a surface water body 102 and an aquifer 104. A piezometer 108 coupled to the submersible system 106 is disposed within the aquifer 104, which may collect groundwater from the aquifer 104 for the submersible system 106 to measure. In some embodiments, the piezometer 108 may collect groundwater via inlets or ports on the piezometer that allow groundwater to pass into the interior of the piezometer 108. A surface fluid port 110, also coupled to the submersible system 106, is exposed to the surface water in the surface water body 102, and allows the submersible system 106 to access and measure the surface water. A communications link 112 may link the submersible system 106 to a buoy 114, and may allow the submersible system 106 to transmit and/or receive data and/or instructions to and from the buoy 114. Communications link 112 may be a wired link, such as an electrical link or an optical fiber link. In some embodiments, communications link 112 may be or also include a wireless link, such as an acoustic or optical link. Buoy 114 may include a second communications link (not shown), which may include a wired link and/or a wireless link, for transmitting and/or receiving data and/or instructions to and from an external source. In some embodiments, buoy 114 may be anchored by anchor 116.

Figure 2:
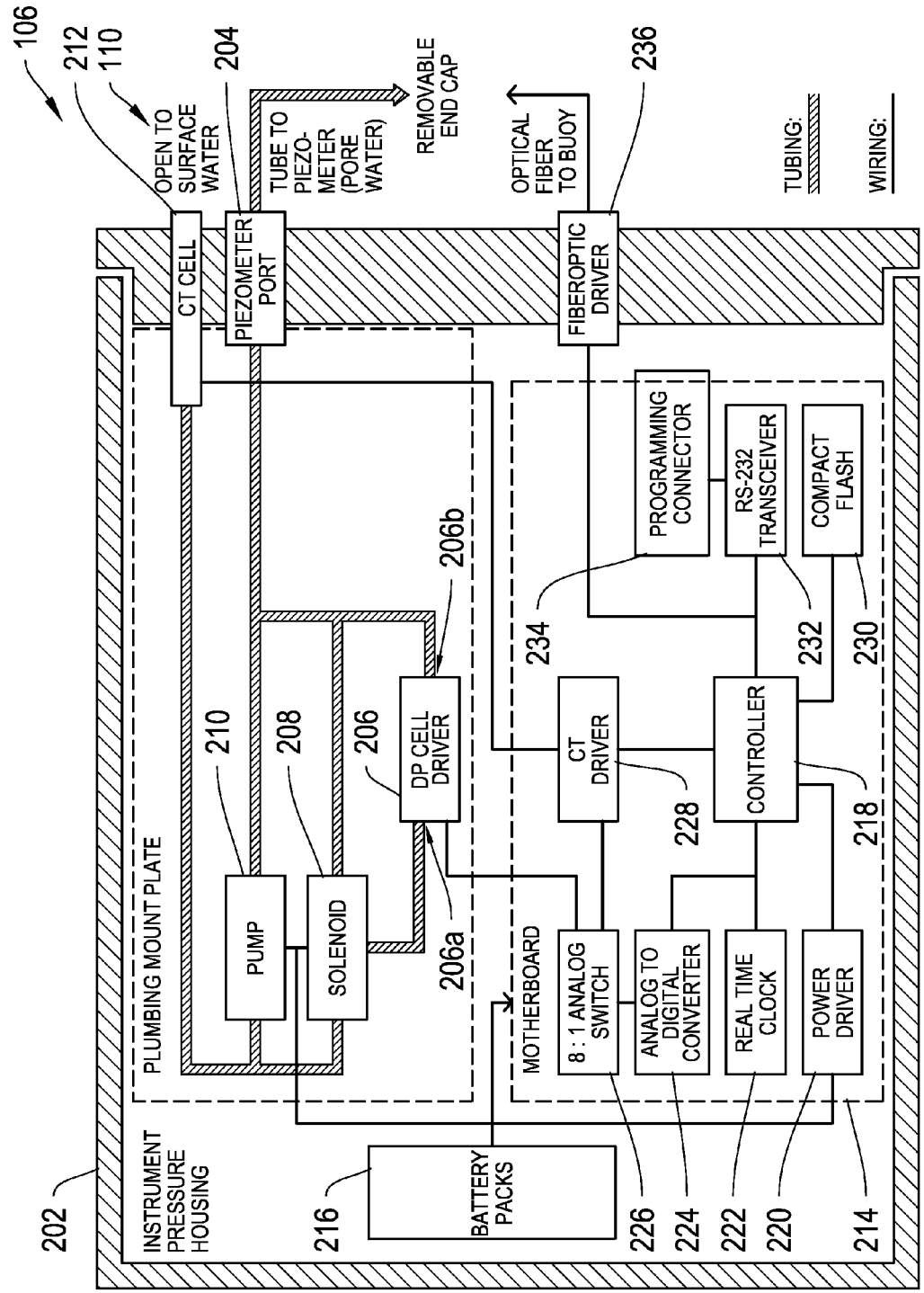
FIG. 2 depicts a block diagram of a submersible system for measuring hydraulic parameters, according to an illustrative embodiment of the invention.

FIG. 2 depicts a block diagram of a submersible system 106 for measuring hydraulic parameters, according to an illustrative embodiment of the invention. Submersible system 106 includes a watertight housing 202 with a piezometer port 204 and a surface fluid port 110. In one embodiment, the watertight housing 202 may be a pressure case machined from a length of standard 6-inch schedule 80 PVC pipe. In this embodiment, one end of the cylinder may be sealed while the other end may contain a removable end cap for access to internal components. In this embodiment, the housing may sustain up to approximately 2 MPa of water pressure, equivalent to about 200 meters of water depth. In other embodiments, the watertight housing 202 may be fabricated of other materials, such as metal, and may be coated with one or more coatings to, for example, providing corrosion resistance and resistance to salt water. In some embodiments, the watertight housing 202 may be able to sustain depths greater than 200 meters.

Differential pressure (DP) sensor 206 is disposed within the watertight housing 202, and includes a first inlet 206a and a second inlet 206b. The DP sensor 206 may be configured to measure data representative of the differential pressure between a fluid at the first inlet 206a and a fluid at the second inlet 206b. In some embodiments, the DP sensor 206 may include a single DP sensor, such as a Honeywell 24PC pressure sensor. In other embodiments, the DP sensor 206 may include two more DP sensors, or two or more pressure sensors. In these embodiments, the differential pressure measurement may be performed by comparing the measured pressures from the two or more sensors.

A valve 208, also disposed within the watertight housing 202, may control and/or regulate the flow of fluid to the DP sensor 206. The valve 208 may be connected to the piezometer port 204, the surface fluid port 110, the first inlet 206a, and the second inlet 206b via one or more tubes disposed within the watertight housing 202. In certain embodiments, the valve 208 may be configured to connect first inlet 206a to the surface fluid port 110, or may be configured to connect first inlet 206a to the piezometer port 204. The valve 208 may be a three-way valve with three inputs, and in certain embodiments may only connect one input to another input, leaving the third input isolated and disconnected. In some embodiments, the valve 208 may include a poppet valve, such as a poppet valve available from Neptune Research.

Submersible system 106 may further include a pump 210. Pump 210 may pump surface water and/or groundwater into and out of submersible system 106, and may circulate surface water and/or groundwater to and/or from both piezometer port 204 and surface fluid port 110 via one or more tubes disposed within the watertight housing 102. In certain embodiments, pump 210 may be a peristaltic pump configured to isolate fluid from the piezometer port from fluid from the surface fluid port 110. For example, pump 210 may be a peristaltic pump available from AUTOCLUDE, located in Leeds, UK. The submersible system 106 may also include a conductivity-temperature (CT) sensor 212, such as a model 545 CT cell manufactured by AMBER SCIENCE INC., located in Eugene, Oreg. In some embodiments, the CT sensor 212 is disposed near surface fluid port 110. In certain embodiments, submersible system 106 may include sensors for measuring other parameters, such as gas content, fluid transparency, and only other parameters associated with fluids or water quality.

Submersible system 106 may include electronics module 214 and a power supply 216 for powering the electronics module 214. Valve 208, pump 210, DP sensor 206 and CT sensor 212 may be powered by electronics module 214, which draws power from the power supply 216. The power supply 216 may include one or more portable power sources, such as batteries or battery packs. The batteries may be alkaline, lead-acid, lithium, lithium-ion, or any suitable chemistry. In some embodiments, power supply 216 may include a plurality of battery packs. In these embodiments, one battery pack may power electronics module 214, and a different battery pack may power the pump 210 and/or the valve 208. In certain embodiments, each of the plurality of battery packs may operate interchangeably and automatically, such that when one battery pack drains, another battery pack may begin providing power. In some embodiments, the system 100 (FIG. 1) may include one or more ambient power generators coupled to charge power supply 216, such as a solar panel mounted on buoy 114 (FIG. 1) or a tidal/wave power generator mounted on buoy 114 (FIG. 1) or the submersible system 106. The electronics module 214 may include a controller 218, which may include a microcontroller, a microprocessor, or any suitable processing circuitry. For example, controller 218 may include a PIC 18LF877 processor, manufactured by Microchip Technology, Inc., located in Chandler, Ariz. Controller 218 may be coupled to the valve 208 and the pump 210 via power driver 220. A real time clock 222 may provide timing signals to the controller 218, which may control the DP sensor and the CT sensor through the analog to digital (A/D) converter 224, the analog switch 226, and the CT driver 228. For example, the real time clock 222 may include a MAX3231 real-time clock, manufactured by Maxim Integrated Products, located in Sunnyvale, Calif., and the A/D converter 224 may include a LTC2400 A/D converter, manufactured by Linear Technology, located in Milpitas, Calif. Controller 218 may also be coupled to a storage device 230, which may include a Compact Flash memory card.

Controller 218 may be programmed to automatically perform measurement and/or data transmission/storage functions. For example, pre-programmed measurement, calibration, and transmission schedules may be provided to the controller 218, which then automatically executes the measurements, calibration, or transmission according to the schedules. In some embodiments, the pre-programmed schedules may be provided to the controller 218 before the submersible system 106 is deployed. Optionally, the schedules may be provided to the controller 218 remotely, via communications link 112, while the submersible system 106 is deployed. In some embodiments, schedules may be both provided before deployment and updated or superseded during deployment.

A transceiver 232 and a programming connector 234 may be coupled to the controller 218, to enable a user to program the controller 218. For example, transceiver 232 may include a MAX3223 RS-232 transceiver. Controller 218 may transmit or receive data and/or instructions through a fiber optic driver 236, which may be coupled to buoy 114 (FIG. 1). In some embodiments, controller 218 may communicate with buoy 114 via an electrical connection, and/or via a wireless connection. Optionally, controller 218 may transmit information about the status of the submersible system. For example, the controller 218 may transmit information about the amount of available storage in storage device 230, the integrity of the collected data, whether the sensors require maintenance, or the amount of power remaining in the power supply 216. In some embodiments, the transmission of data and/or information may occur in substantially real time. For example, the controller 218 may transmit differential pressure, calibration offset, conductivity and/or temperature data as soon as it is measured. In other embodiments, the controller 218 may store the measured data in local storage 230, and transmit the stored data at certain intervals, which may be predetermined or pre-programmed Optionally, the controller 218 may transmit stored data when the data stored in local storage 230 reaches a certain size.

Figure 3A:
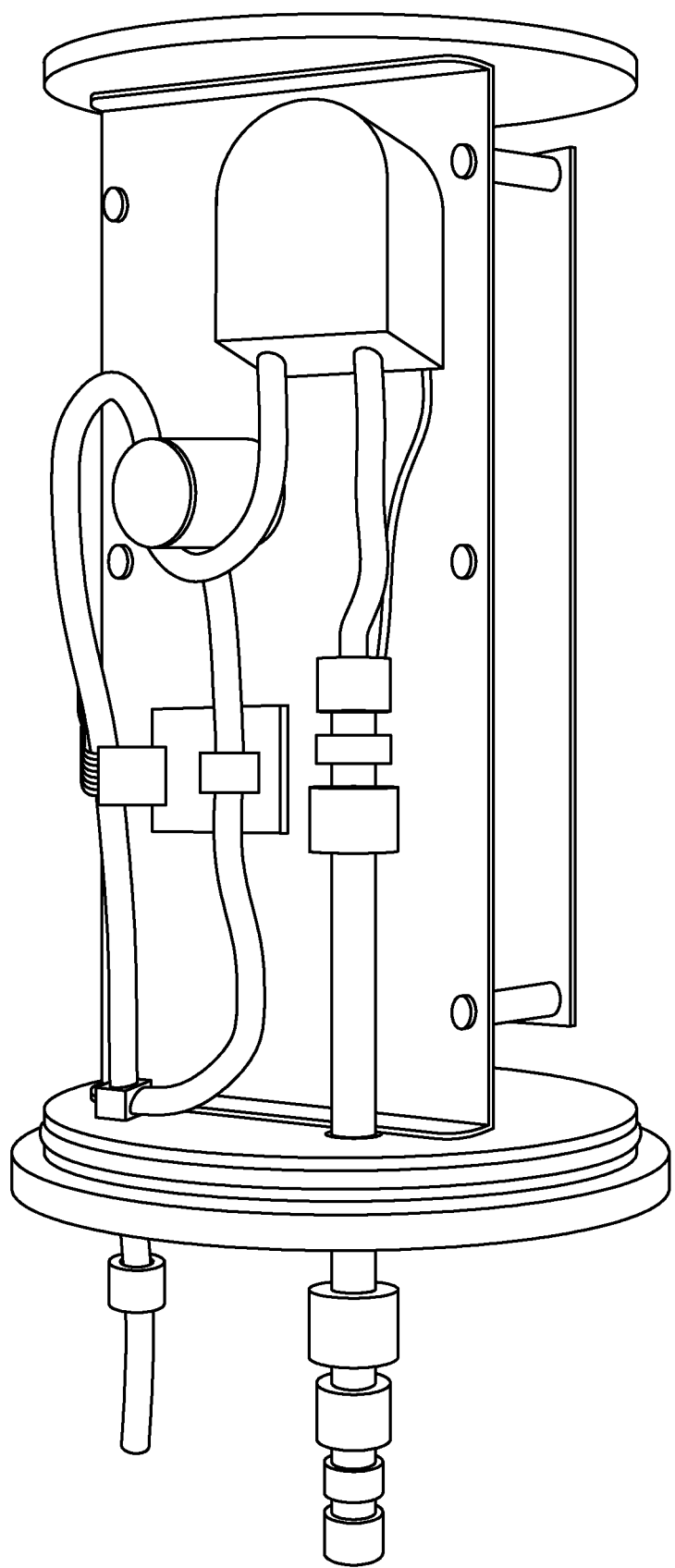
FIGS. 3A-B depict the submersible system for measuring hydraulic parameters, according to an illustrative embodiment of the invention.
Figure 3B:
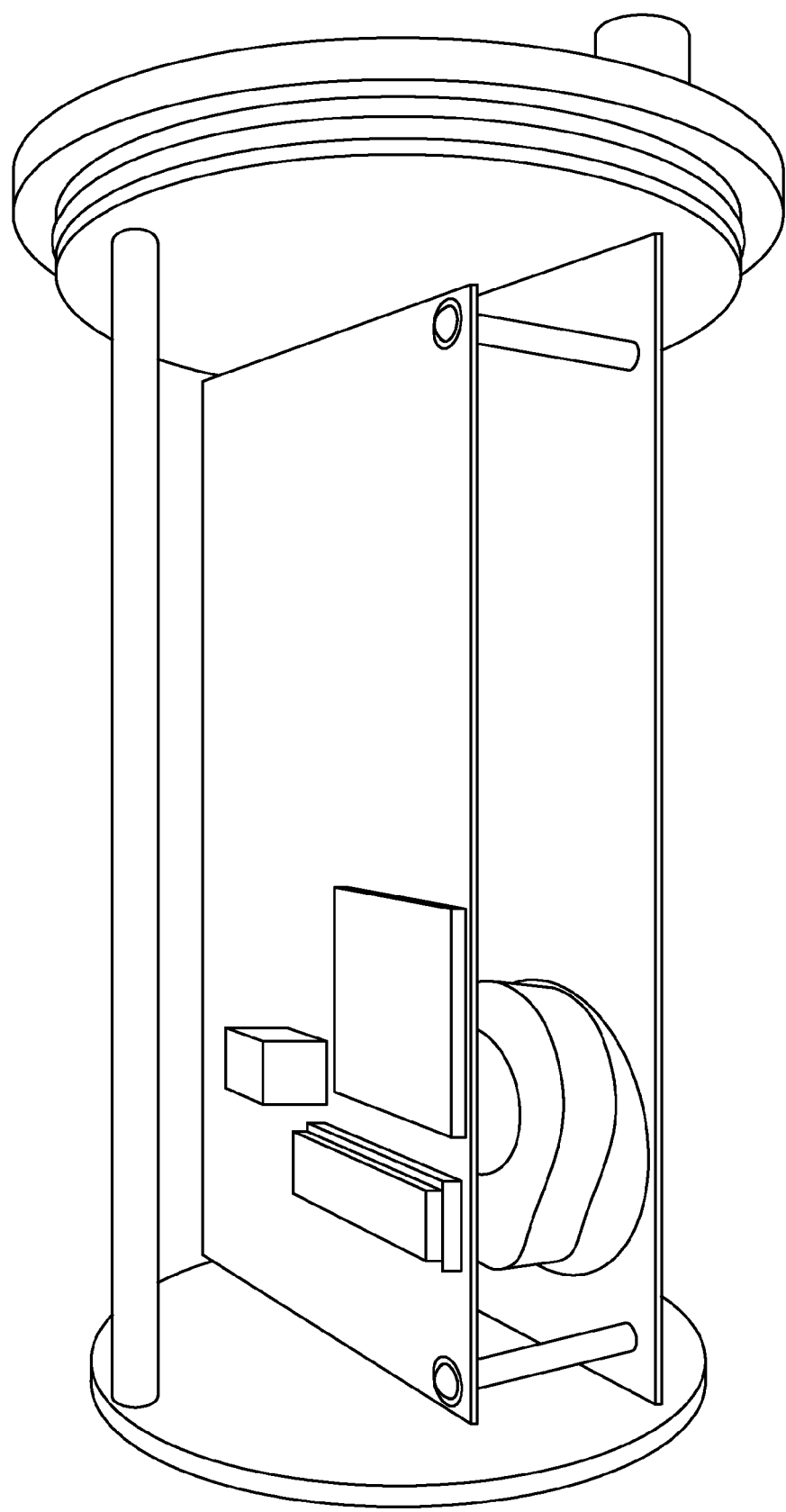

In certain embodiments, controller 218 may be programmed remotely via communications link 112. For example, software, instructions, or pre-programmed measurement schedules may be received by controller 218 via communications link 112. In some embodiments, the electronics module 214 and the power supply 216 may be mounted on a printed circuit board. In other embodiments, the power supply 216 may be separate from the printed circuit board. A submersible system 106 is depicted in FIGS. 3A-B, which depict views of the submersible system 106 from two different angles. The components of the submersible system 106 may be selected to provide durability, low power requirements, and low maintenance requirements, so that the submersible system 106 may be deployed in harsh environmental conditions such as severe winter weather and highly saline environments without maintenance for periods of six months or more. Other details of the system 100 and submersible system 106 is described in "A Differential Pressure Instrument with Wireless Telemetry for In-Situ Measurement of Fluid Flow across Sediment-Water Boundaries," *Sensors* 2009, 9, 404-429, the entirety of which is hereby incorporated by reference.

Figure 4A:
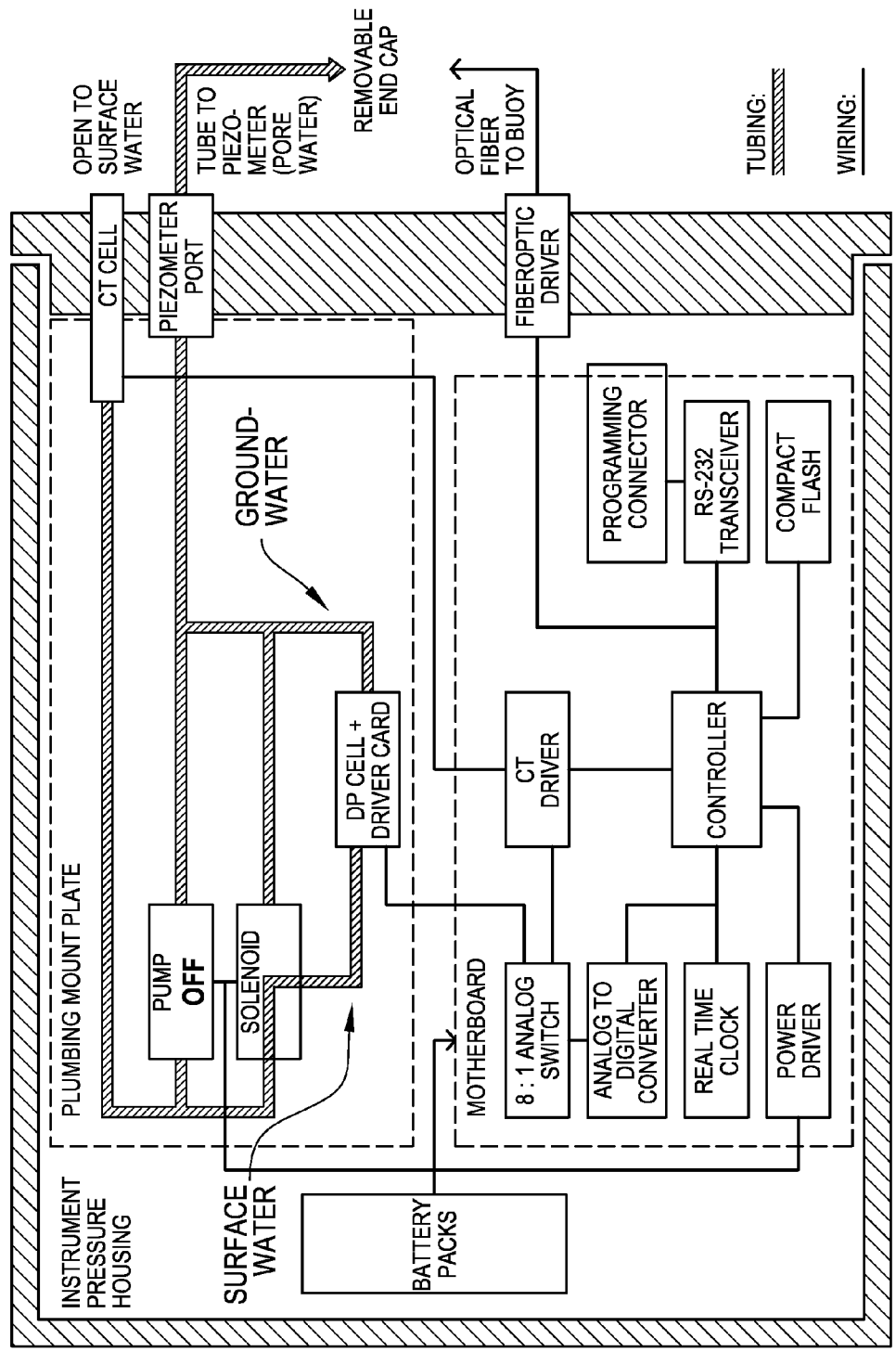
FIGS. 4A-D depict different operating configurations of the submersible system of FIG. 2, according to illustrative embodiments of the invention.

FIGS. 4A-D depict different operating configurations of the submersible system 106, according to illustrative embodiments of the invention. FIG. 4A depicts a first operating configuration of the submersible system 106. In the first configuration, the submersible system 106 measures the differential pressure between surface water, accessed through surface fluid port 110, and groundwater, accessed through piezometer port 204. The valve 208 is configured to connect inlet 206*a* with surface fluid port 110, allowing surface water to reach inlet 206*a*, and inlet 206*b* is automatically connected with piezometer port 204, allowing groundwater collected by the piezometer 108 (FIG. 1) to reach inlet 206*b*. The pump 210 remains off to avoid disturbing the measurement process. The DP sensor 206 may then measure the differential pressure between the surface water at inlet 206*a* and the groundwater at inlet 206*b*. In some embodiments, the DP sensor 206 takes and records a series of differential pressure measurements.

Figure 4B:
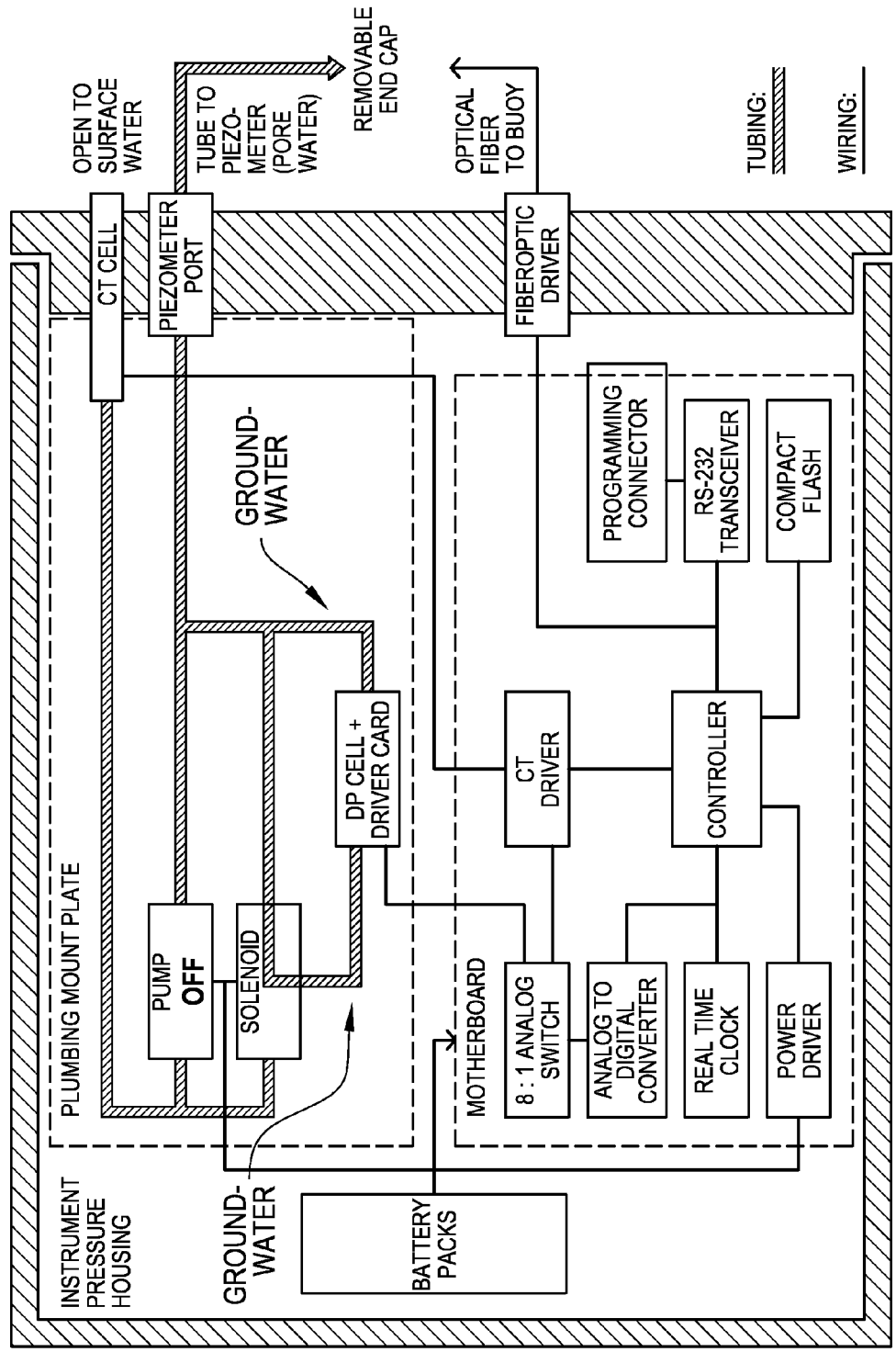

FIG. 4B depicts a second operating configuration of the submersible system 106, for measuring sensor error. Sensor errors may arise from many causes but can generally be categorized as either zero errors or gain errors. A zero error is one in which readings are shifted by a constant value while a gain error affects signal amplitude. Gain errors may be reduced or eliminated through careful calibration.

In some embodiments, the largest source of error in pressure sensors is zero, or null-offset, error. This represents variations in the null output of the sensor (electrical output produced when the pressure at the two inlets is equal) due to changes in forcing and/or ambient conditions such as temperature.

Additional sources of error can occur when the output signal of the sensor is recorded inaccurately. This type of error encompasses all electronics errors. Designing electronics to accurately amplify, digitize, and record signals with accuracy in the one part per thousand range is relatively easy.

External field conditions such as waves can result in instantaneous DP measurements that do not reflect average DP conditions. In order to minimize the effect of waves on the DP measurements, the sensor may be programmed to take an average of up to 256 differential pressure readings over roughly 30 seconds, which allows differential pressure sampling across many waves such that an accurate average pressure difference is obtained.

In addition to errors associated with instrument measurements, there are model errors associated with the flux calculations. In particular, a model must be chosen to represent fluid density as a function of elevation. By determining salinity at two locations, the salinity and density profiles may be constrained with the assumption of a salinity-depth model. A full discussion of model errors is beyond the scope of this description, but it has been determined that in an extreme case this error is ~±0.4 mm H$_2$O per psu salinity difference between surface water and groundwater. In practice, the error is likely much lower and can be reduced considerably by direct sampling in the interval between the two sensor intakes.

In the second configuration, the submersible system 106 measures the calibration offset or null-offset error of the DP sensor 206. The valve 208 is configured to connect inlet 206a with piezometer port 204, allowing groundwater collected by the piezometer 108 (FIG. 1) to reach both inlet 206a and inlet 206b. As in the first configuration, the pump 210 remains off to avoid disturbing the measurement process. The differential pressure measured in this configuration by the DP sensor 206 is representative of its calibration offset error. By subtracting this calibration offset error from the surface water-groundwater differential pressure reading, instantaneous zero errors from all sources, including drift and orientation, may be eliminated.

Zero, or null-offset, error may be a significant source of error in pressure sensors. This represents variations in the null output of the sensor (electrical output produced when the pressure at the two ports is equal) due to changes in forcing and/or ambient conditions such as temperature. In this instrument, null-offset error may be eliminated by incorporating the 3-way valve, which allows collection of a null output reading before each DP measurement.

Figure 4C:
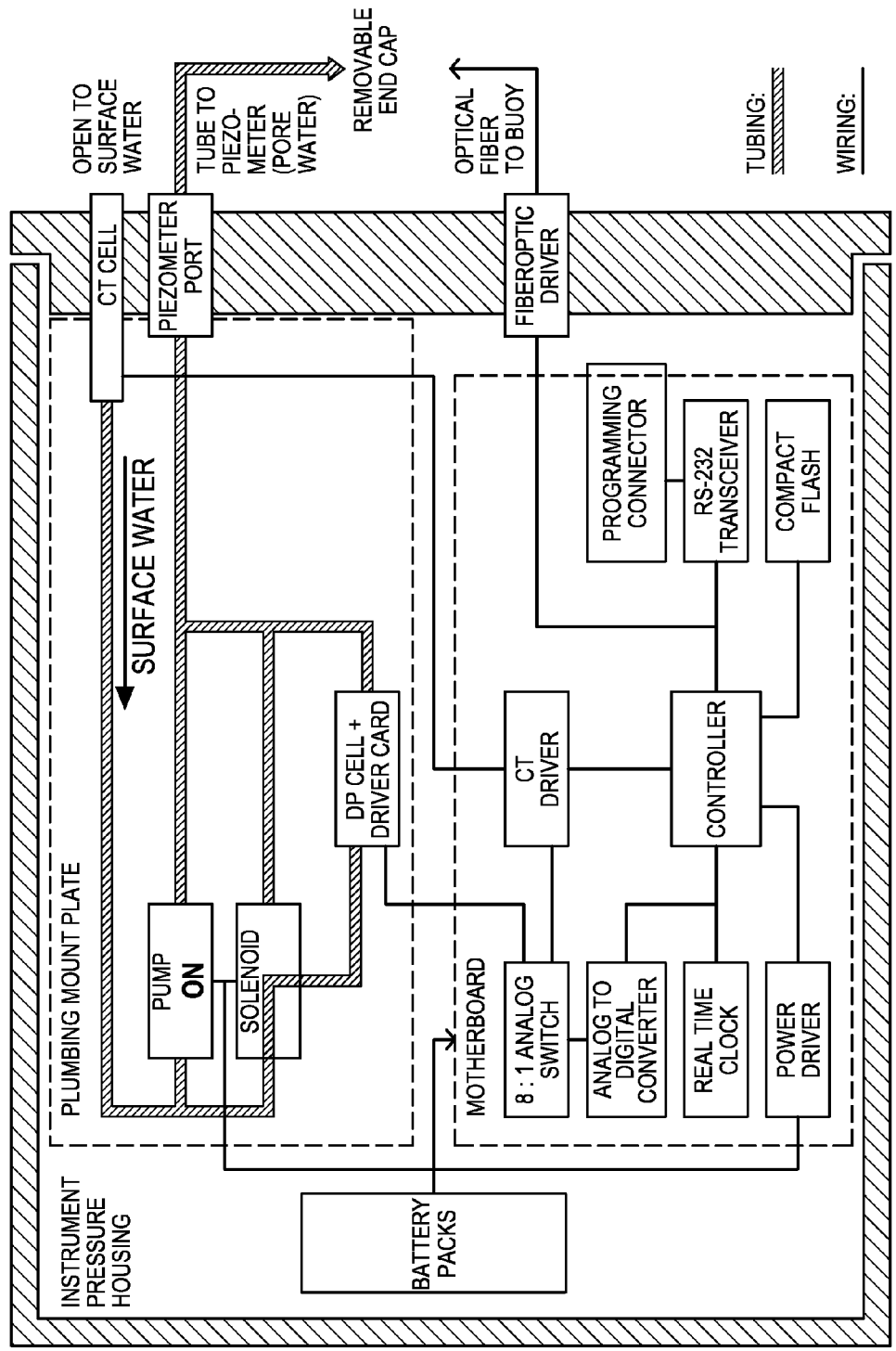

FIG. 4C depicts a third operating configuration of the submersible system 106. In the third configuration, the submersible system 106 measures the electrical conductivity and/or temperature of the surface water accessed through surface fluid port 110. The valve 208 may be configured to connect inlet 206a with either surface fluid port 110 or piezometer port 204. The pump is actuated to pump surface water from surface fluid port 110 into the submersible system, passing the surface water through the CT sensor 212. The CT sensor 212 then measures the electrical conductivity and/or temperature of the surface water. In some embodiments, the pump is only actuated for a short period of time, not long enough to pump surface water throughout the submersible system 106. In certain embodiments, the pump may be actuated for about ten seconds.

Figure 4D:
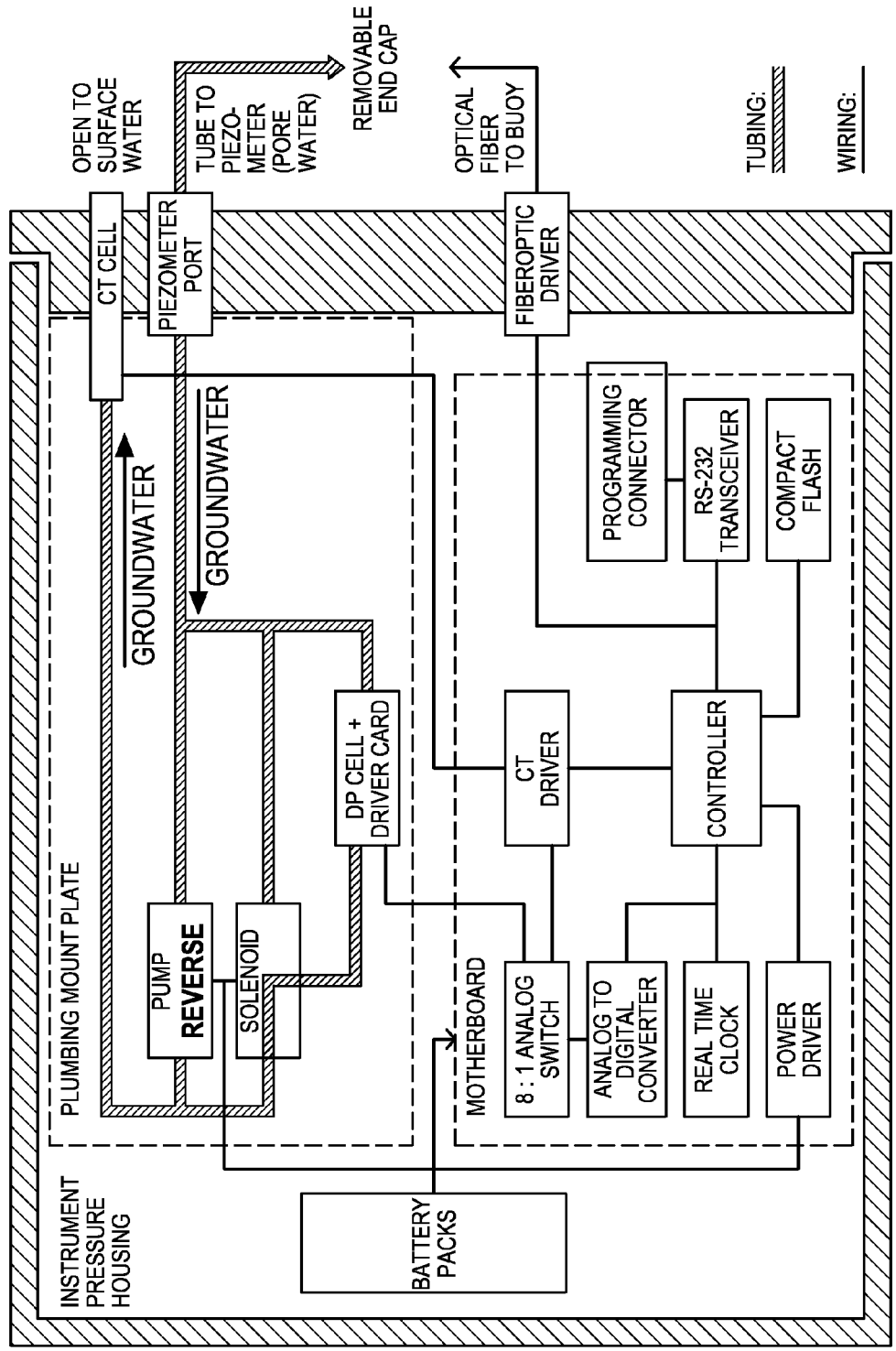

FIG. 4D depicts a fourth operating configuration of the submersible system 106. In the fourth configuration, the submersible system 106 measures the electrical conductivity and/or temperature of the groundwater accessed through the piezometer port 204. The valve 208 may be configured to connect inlet 206a with either surface fluid port 110 or piezometer port 204 The pump is actuated in reverse, to pump groundwater from the piezometer port 204 and out through surface fluid port 110. As the pumped groundwater flows out through surface fluid port 110, it passes through CT sensor 212. The CT sensor 212 then measures the electrical conductivity and/or temperature of the surface water. In some embodiments, the pump is actuated in reverse long enough to pump groundwater throughout the entire submersible system 106. In addition to allowing the CT sensor 212 to measure the conductivity and temperature of the groundwater, the groundwater pumping may also flush the submersible system 106 of any air bubbles that are present. Air bubbles present in the measurement system may affect the differential pressure values measured by DP sensor 206. While in the above embodiments, the pump is actuated in reverse for the groundwater CT measurement, in other embodiments the pump may be configured to be actuated in reverse for the surface water CT measurement. In other embodiments, a plurality of pumps may be used to circulate water through the submersible system 106.

Figure 5:
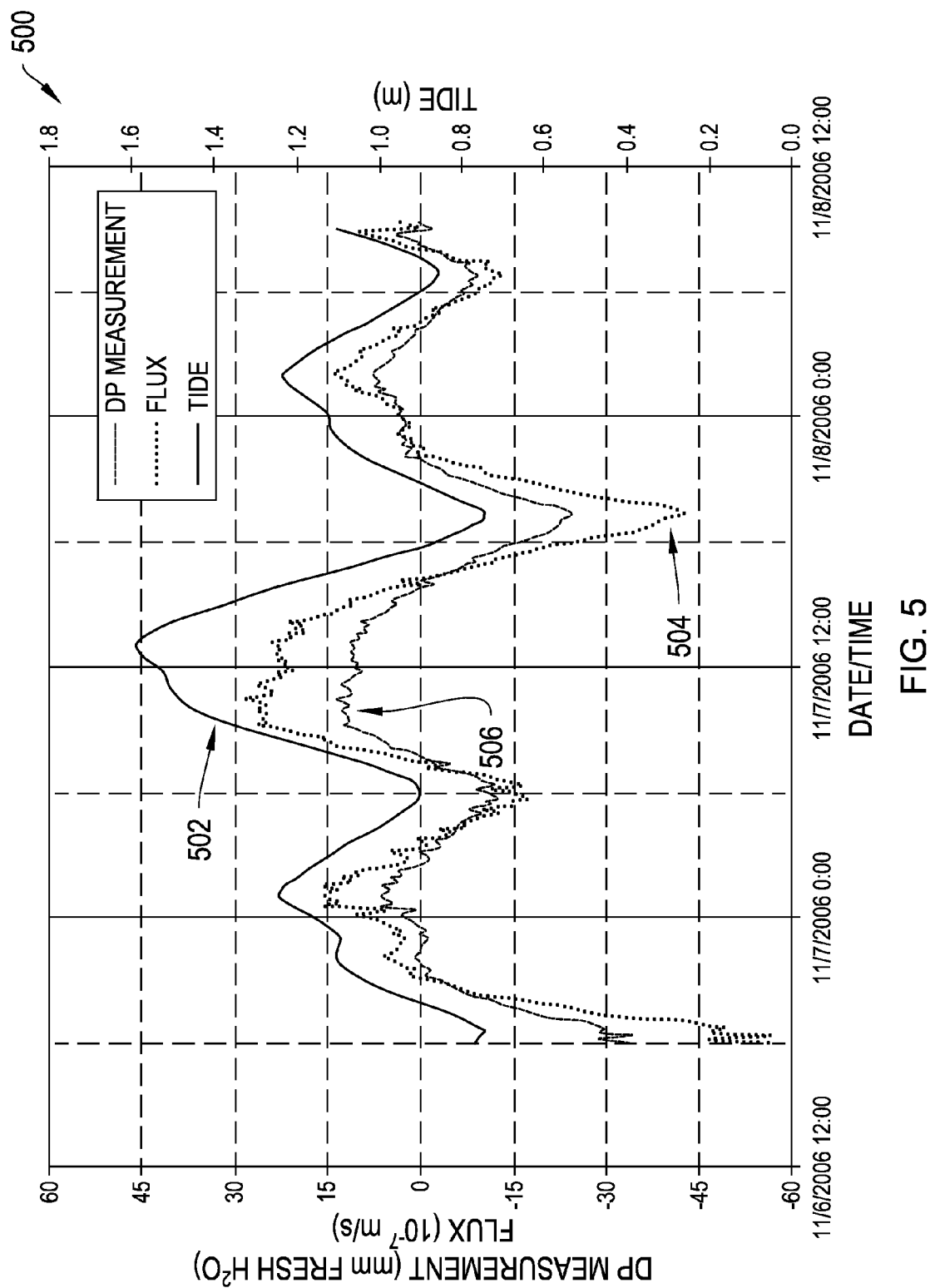
FIG. 5 is a chart depicting hydraulic parameters measured by a submersible system, according to an illustrative embodiment of the invention.

FIG. 5 is a chart 500 depicting hydraulic parameters measured by a submersible system in Waquoit Bay, Mass., according to an illustrative embodiment of the invention. Chart 500 shows a DP measurement curve 502, a water flux curve 504, and a tide curve 506. As the tide rises and falls, reflected in the rises and falls of the tide curve 506, the water flux between the surface water and the groundwater, reflected in the water flux curve 504, changes accordingly. For example, at high tide, water flux tends to be positive, indicating that water is flowing from the surface water body into the aquifer. This is because at high tide, the level of the surface water body is higher, resulting in a higher surface water pressure at the surface water-groundwater interface, which drives water into the aquifer. In contrast, at lower tides, when the level of the surface water body is lower, the surface water pressure at the interface is lower, which may result in water flow from the aquifer into the surface water body, or a negative water flux as depicted in chart 500. The DP measurement curve 502 was used to calculate the water flux curve 504 according to equation (3).

Figure 6:
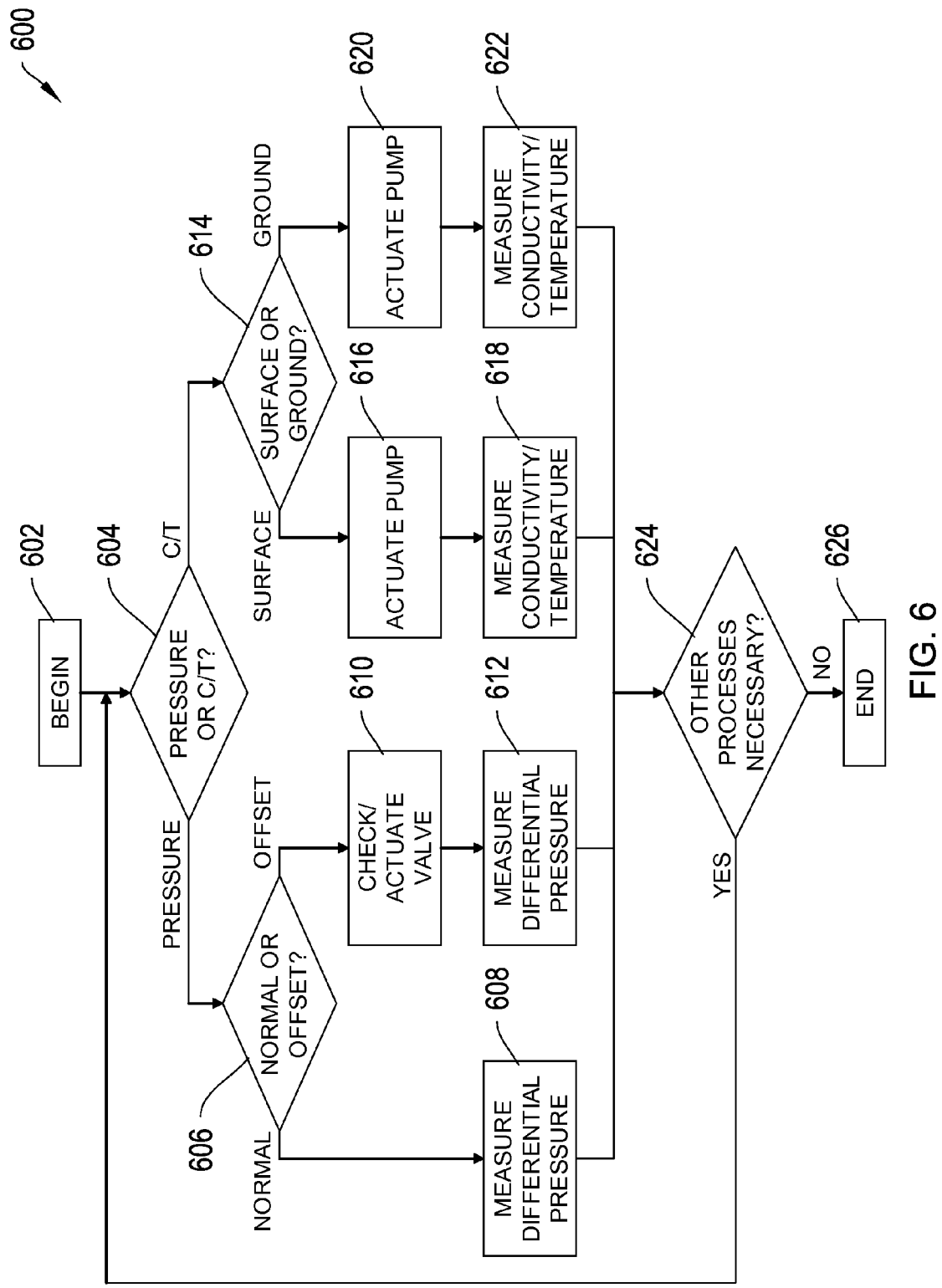
FIG. 6 is a flowchart of a process for measuring hydraulic parameters with a submersible system, according to an illustrative embodiment of the invention.

FIG. 6 is a flowchart of a process 600 for measuring hydraulic parameters with a submersible system, according to an illustrative embodiment of the invention. Process 600 may be executed by, for example, electronics module 214, which may include controller 218 (FIG. 2). The process 600 begins at step 602, when controller 218 determines that a measurement is to be performed. At step 604, controller 218 may determine if a pressure measurement is to be performed or a CT measurement is to be performed. If a pressure measurement is to be performed, process 600 proceeds to step 606, where controller 218 determines if a normal DP measurement is to be performed or if a calibration offset error measurement is to be performed. If a normal DP measurement is to be performed, measurements of the differential pressure between the surface water and the groundwater is performed by, for example, controller 218 in conjunction with DP sensor 206, in step 608. The process then moves to step 624, where controller 218 determines if other processes should be performed. In some embodiments, the collected data may be stored in a local storage device or transmitted to an external receiver via a communications links in step 624. If other processes should not be performed, the process ends at step 626. If other processes should be performed, the process reverts to step 604.

If, at step 606, controller 218 determines that a calibration offset error measurement is to be performed, controller 218 may actuate the valve 208 (FIG. 2) to the correct position in step 610, placing the submersible system 106 in the second configuration and allowing groundwater access to both inlets of the DP sensor 206. The differential pressure measurement(s) are then taken by DP sensor 206 at step 612. The process then moves to step 624, where controller 218 determines if other processes should be performed. In some embodiments, the collected data may be stored in a local storage device or transmitted to an external receiver via a communications links in step 624. If other processes should not be performed, the process ends at step 626. If other processes should be performed, the process reverts to step 604.

If, at step 604, controller 218 determines that a CT measurement is to be taken, process 600 proceeds to step 614, where controller 218 determines if a surface water CT measurement is to be taken or if a groundwater CT measurement is to be taken. If the former, the process proceeds to step 616, where the submersible system 106 is placed in the third configuration and the pump 210 is actuated by controller 218 to flow surface water through CT sensor 212. The CT sensor 212 takes one or more CT measurements of the surface water at step 618. The process then moves to step 624, where controller 218 determines if other processes should be performed. In some embodiments, the collected data may be stored in a local storage device or transmitted to an external receiver via a communications links in step 624. If other processes should not be performed, the process ends at step 626. If other processes should be performed, the process reverts to step 604.

If, at step 614, controller 218 determines if a groundwater CT measurement is to be taken, the process proceeds to step 620, where the submersible system 106 is placed in the fourth configuration and controller 218 actuates the pump 210 in reverse to flow groundwater through CT sensor 212. The CT sensor 212 then takes one or more CT measurements of the groundwater at step 622. The process then moves to step 624, where controller 218 determines if other processes should be performed. In some embodiments, the collected data may be stored in a local storage device or transmitted to an external receiver via a communications links in step 624. If other processes should not be performed, the process ends at step 626. If other processes should be performed, the process reverts to step 604.

In certain embodiments, normal DP measurement(s) in the first configuration are followed by one or more calibration offset error measurements in the second configuration. In some embodiments, the surface water CT measurements and the groundwater CT measurements may be performed successively, in any order. After any one of the calibration offset error measurements, the surface water CT measurements, and the groundwater CT measurements, the submersible system 106 may automatically revert to the first configuration, to allow the water in the submersible system 106 to equilibrate in preparation for the next normal DP measurement(s). In other embodiments, the measurements and associated configurations may be performed and/or enabled in any order. For example, groundwater CT sensing in the third configuration may be performed before surface water DP sensing in the first configuration.

Variations, modifications, and other implementations of what is described may be employed without departing from the spirit and scope of the invention. More specifically, any of the method and system features described above or incorporated by reference may be combined with any other suitable method or system feature disclosed herein or incorporated by reference, and is within the scope of the contemplated inventions. The systems and methods may be embodied in other specific forms without departing from the spirit or essential characteristics thereof. The foregoing embodiments are therefore to be considered in all respects illustrative, rather than limiting of the invention. The teachings of all references cited herein are hereby incorporated by reference in their entirety.

The invention claimed is:

1. A submersible system for measuring hydraulic parameters across an interface between a surface water body and an aquifer, comprising:
a piezometer, disposed in the aquifer for collecting groundwater;
a surface fluid port, disposed in the surface water body and exposed to the surface water;
a watertight housing,
a differential pressure sensor, having at least two inlets, disposed within the watertight housing for collecting data representative of differential pressure between the groundwater collected by the piezometer and the surface water at the surface fluid port,
a valve disposed within the watertight housing connected to the piezometer, the surface fluid port, and the differential pressure sensor for controlling flow of at least one of the groundwater and the surface water to the differential pressure sensor, and
wherein in a first configuration, the valve is configured to connect one inlet of the differential pressure sensor to the piezometer and another inlet to the surface fluid port, and in a second configuration, the valve is configured to connect at least two inlets of the differential pressure sensor to the piezometer.

2. The system of claim 1, further comprising processing circuitry configured to automatically operate the valve to switch between the first configuration and the second configuration.

3. The system of claim 2, wherein the processing circuitry is configured to automatically operate the valve according to a pre-programmed schedule.

4. The system of claim 1, further comprising:
a pump configured to circulate at least one of the groundwater and the surface water from at least one of the piezometer and the surface fluid port, and
a fluid sensor, configured to measure at least one of electrical conductivity and temperature of at least one of the groundwater and the surface water; wherein:
in a third configuration, the pump is configured to circulate the surface water through the fluid sensor,
in a fourth configuration, the pump is configured to circulate the groundwater through the fluid sensor, and
in at least one of the third configuration and fourth configuration, the pump is configured to flush the system to remove air bubbles.

5. The system of claim 4, further comprising processing circuitry configured to automatically operate at least one of the valve and the pump to switch between any of the first, second, third, and fourth configurations.

6. The system of claim 1, further comprising a communications link for transmitting the collected data.

7. The system of claim 6, wherein the communications link transmits the collected data in substantially real time.

8. The system of claim 6, wherein the communications link includes a fiber optic link.

9. The system of claim 6, wherein the communications link includes a wireless link.

10. The system of claim 1, further comprising a memory device for storing the collected data.

11. The system of claim 10, wherein the memory device includes a Compact Flash memory card.

12. The system of claim 1, wherein the submersible system is configured to collect data at intervals of about fifteen minutes for at least six contiguous months.

13. The system of claim 1, further comprising a battery pack for supplying power.

14. The system of claim 1, wherein the valve is a solenoid valve.

15. The system of claim 1, wherein the valve is connected to the piezometer, the surface fluid port, and the differential pressure sensor via at least one tube.

16. The system of claim 1, wherein the valve is mechanically connected to the piezometer, the surface fluid port, and the differential pressure sensor.

17. A method for measuring hydraulic parameters across an interface between a surface water body and an aquifer, comprising:
providing a submersible system, having
a piezometer disposed in the aquifer for collecting groundwater,
a surface fluid port disposed in the surface water body and exposed to the surface water, a watertight housing;

a differential pressure sensor, having at least two inlets and disposed within the watertight housing, a valve disposed within the watertight housing and connected to the piezometer, the surface fluid port, and the differential pressure sensor, for controlling flow of at least one of the groundwater and the surface water to the differential pressure sensor, and processing circuitry for controlling the valve;

collecting data with the differential pressure sensor representative of differential pressure between the groundwater collected by the piezometer and the surface water at the surface fluid port in a first configuration where the valve is configured to connect one inlet of the differential pressure sensor to the piezometer and another inlet to the surface fluid port;

collecting calibration data with the differential pressure sensor in a second configuration where the valve is configured to connect at least two inlets of the differential pressure sensor to the piezometer; and automatically switching, with the processing circuitry, from one configuration to a different configuration.

18. The method of claim 17, wherein the submersible system further includes a pump configured to circulate at least one of the groundwater and the surface water from at least one of the piezometer and the surface fluid port, and a fluid sensor, and further comprising:

collecting data representative of at least one of electrical conductivity and temperature of the surface water with the fluid sensor in a third configuration where the pump is configured to circulate the surface water through the fluid sensor;

collecting data representative of at least one of electrical conductivity and temperature of the groundwater with the fluid sensor in a third configuration where the pump is configured to circulate the groundwater through the fluid sensor; and flushing the system with the pump to remove air bubbles.

19. The method of claim 17, wherein the submersible system further includes a communications link, and further comprising transmitting the collected data.

20. The method of claim 19, comprising transmitting the collected data in substantially real time.

21. The method of claim 19, wherein the communications link includes a fiber optic link.

22. The method of claim 19, wherein the communications link includes a wireless link.

23. The method of claim 17, wherein the submersible system includes a memory device, and further comprising storing the collected data on the memory device.

24. The system of claim 23, wherein the memory device includes a Compact Flash memory card.

25. The method of claim 17, wherein automatically switching includes automatically switching according to a pre-programmed schedule.

26. The method of claim 17, further comprising collecting data with the differential pressure sensor at intervals of about fifteen minutes for at least six contiguous months.

27. The method of claim 17, wherein the submersible system includes a battery pack for supplying power.

* * * * *